United States Patent [19]

Matsuda

[11] Patent Number: 5,355,218
[45] Date of Patent: Oct. 11, 1994

[54] SHEARING INTERFEROMETER FOR MEASURING LENS LATERAL ABERRATION

[75] Inventors: Kiyofumi Matsuda, Tomoaki Eiji, Thomas H. Barnes, Shigern Kokaji; all of Tsukuba, Japan

[73] Assignee: Agency of Industrial Science and Technology Ministry of International Trade and Industry, Tokyo, Japan

[21] Appl. No.: 988,480

[22] Filed: Dec. 10, 1992

[30] Foreign Application Priority Data

Dec. 11, 1991 [JP] Japan .................................. 3-350893

[51] Int. Cl.⁵ .......................................... G01B 9/02
[52] U.S. Cl. .................................... 356/353; 386/359
[58] Field of Search ...................... 356/353, 359, 352

[56] References Cited

U.S. PATENT DOCUMENTS 4,799,770 1/1989 Kahn et al. ..................... 350/331 R
4,940,495 7/1990 Weber et al. ......................... 136/256

OTHER PUBLICATIONS

Nippon Sigma Kohki Shiki Kabushiki Kaisha, *Plate Beamsplitters* Optics and Optical Coatings, C44, C42.

*Primary Examiner*—Samuel A. Turner
*Assistant Examiner*—Russell C. Wolfe
*Attorney, Agent, or Firm*—Oblon, Spivak, McClelland, Maier & Neustadt

[57] ABSTRACT

A shearing interferometer measures the aberration of a lens by passing a beam through the lens, splitting the beam into plural beams with a slightly wedged plate and causing interference between the wavefronts of the beams. The front and rear optical surfaces of the wedged plate are coated with reflective thin films each having a specific reflectance and transmittance.

2 Claims, 7 Drawing Sheets

SHEARING INTERFEROMETER FOR MEASURING LENS LATERAL ABERRATION

BACKGROUND OF THE INVENTION

1. Field of the Invention

This invention relates to a shearing interferometer for measuring lens lateral aberration, specifically to an interferometer which uses the shearing interferometer method for measuring the lateral aberration of a lens.

2. Prior Art Statement

The method of obtaining the lateral aberration curve of a lens using shearing interference fringes has conventionally required analysis of differential interference fringes, making it complicated and time consuming. The inventors studied the possibility of developing a method for enabling the aberration curve to be represented by the shearing interference fringes themselves.

As set out in Japanese Patent Application No. Hei 3-89600, the inventors earlier developed a shearing interferometer for obtaining the lateral aberration curve of a lens, which obtains an interference fringe corresponding to the lateral aberration curve by using a slightly wedged plate to impart horizontal shear to an incident wavefront and then imparting a tilt to the slightly wedged plate by rotating it slightly about its horizontal axis. Their analysis to date shows that when a shear of $\Delta S$ is imparted in the x direction and a tilt of $\alpha$ is imparted in the y direction, the lateral aberration $\phi$ is represented by $$\phi = f0(\lambda/\Delta S)(\Delta m(x:\Delta S) - \alpha y)$$

where f0 is the focal length of the tested lens, $\lambda$ is the wavelength of the light source used, and $\Delta m$ is the order of the interference fringes obtained.

Although the sensitivity for a given amount of aberration and shear can be increased by reducing the amount of tilt $\alpha$, simply doing this causes the interference fringes to spread to such a great extent that it becomes difficult to ascertain accurately the center of the interference fringes.

SUMMARY OF THE INVENTION

This invention was accomplished in light of the aforesaid situation and has as its object to provide a shearing interferometer for measuring lens lateral aberration which enables the lens aberration curve of a lens to be obtained directly as an interference fringe, experiences no reduction in read-out accuracy even when the interference fringe interval is expanded for increasing sensitivity, and thus enables high-sensitivity, high-accuracy measurement.

For achieving this purpose, the invention provides a shearing interferometer for measuring lateral aberration of a lens comprising a laser beam source, an objective for spreading a laser beam from the laser beam source, a slightly wedged plate having a front optical surface and a rear optical surface for receiving the spread beam from the objective, the lens being disposed in an optical path between the objective and the wedged plate for collimating the spread beam, a first reflective thin film formed on the front optical surface of the wedged plate, a second reflective thin film formed on the rear optical surface of the wedged plate, a focusing lens for causing interference between wavefronts split by the wedged plate, and a screen for displaying interference fringes formed.

The laser beam from the laser source passes through the objective onto the test lens and the collimated light exiting from the test lens advances to the slightly wedged plate where it is divided into numerous beams including a beam reflected by the first reflective thin film on the front optical surface of the wedged plate, a beam transmitted through the first reflective thin film, reflected by the second reflective thin film on the rear optical surface of the wedged plate and transmitted back through the first reflective thin film, a beam transmitted through the first reflective thin film, reflected by the second reflective surface, reflected by the first reflective thin film, reflected again by the second reflective thin film and transmitted by the first reflective thin film. The optical paths of the reflected beams are shifted laterally by an amount proportional to the thickness of the wedged plate between the first reflective surface and the second reflective surface. This produces lateral shifts between a large number of wavefronts and, since the first and second reflective thin films are inclined with respect to each other owing to the shape of the wedged plate, tilt is also produced between the different wavefronts. Thus the large number of wavefronts produced by the splitting action of the wedged plate are both laterally shifted with respect to each other and tilted. Since interference fringes are therefore formed by interference between a large number of wavefronts, they are considerably finer than they would otherwise be. Thus, the accuracy with which they can be read is not degraded when the interval between the fringes is expanded for increasing sensitivity. As a result, measurement can be conducted at high sensitivity and with high accuracy.

The above and other objects and features of the invention will be better understood from the following description made with respect to the drawings.

DESCRIPTION OF THE PREFERRED EMBODIMENT

Figure 1:
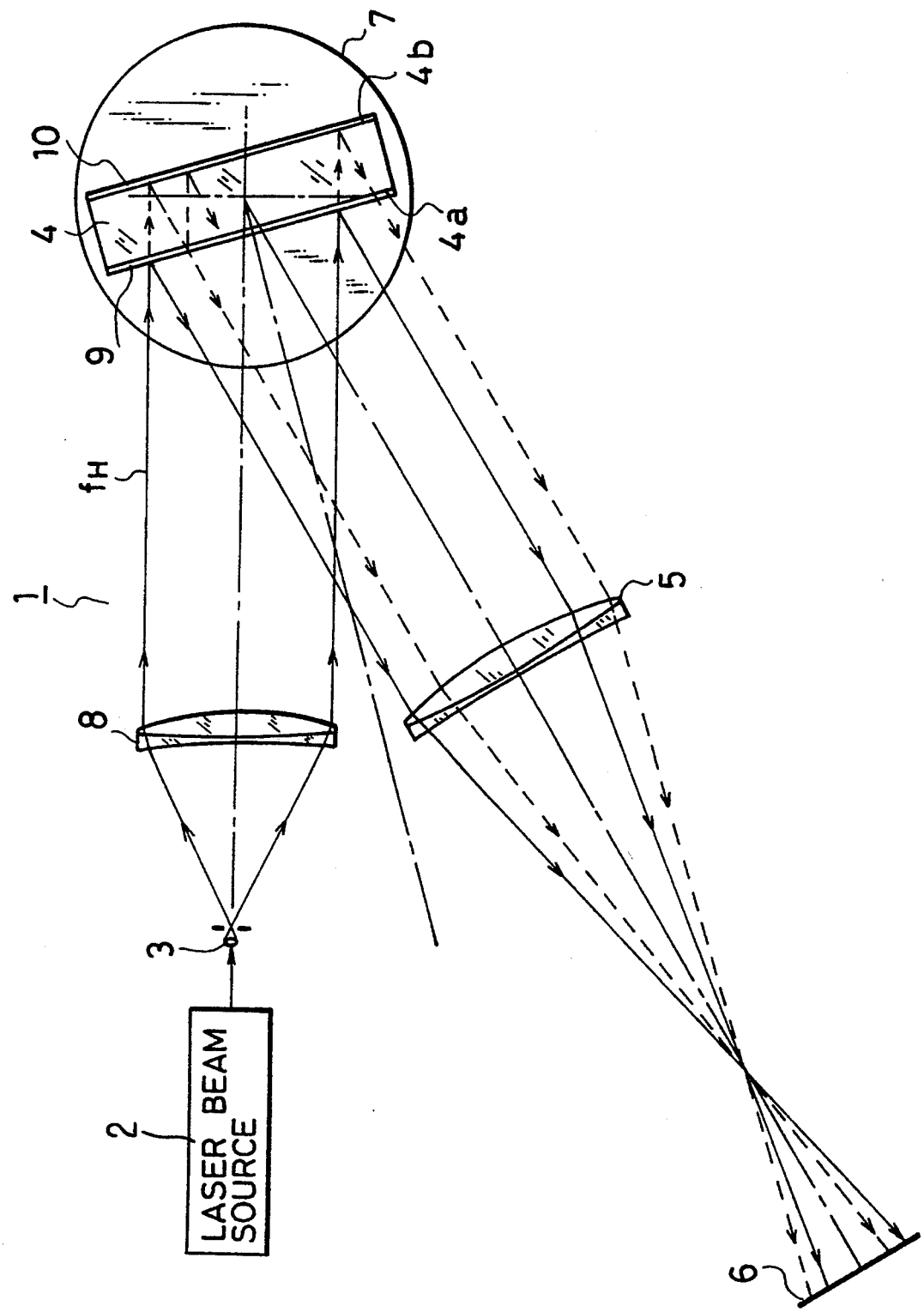
FIG. 1 a schematic view of the configuration of an embodiment of the shearing interferometer according to the invention.
Figure 2:
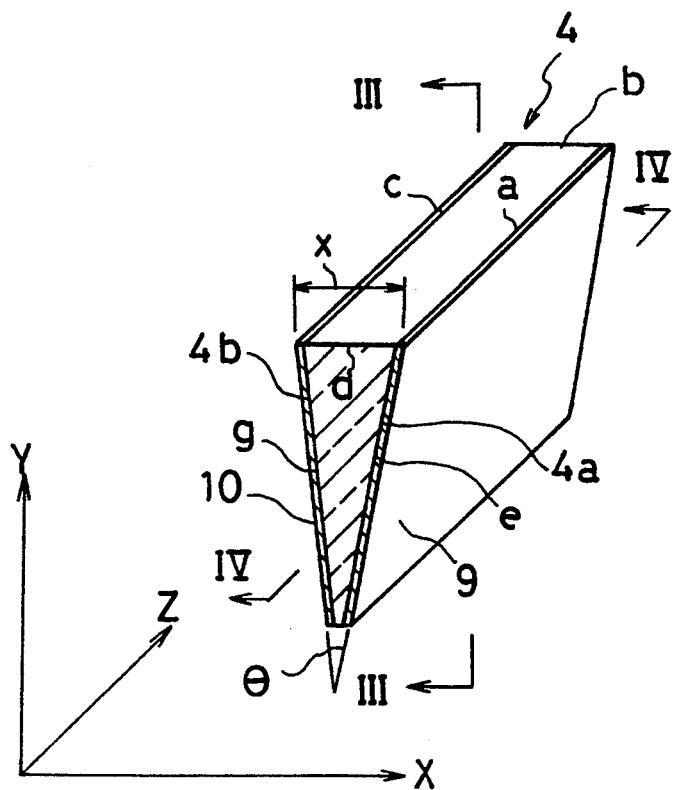
FIG. 2 is a perspective view of a slightly wedged plate that is a component of the shearing interferometer of FIG. 1.

In the schematic view of an embodiment of the invention shown in FIG. 1, an interferometer 1 comprises a He-Ne laser beam source 2, a slightly wedged plate 4, a microscope objective 3, a focusing lens 5 and a screen 6. If convenient, the screen 6 can be replaced with a two-dimensional sensor. The lens to be tested (the test lens 8) is inserted into the optical path between the microscope objective 3 and the wedged plate 4. Reference numeral 7 designates a table for supporting the wedged plate 4.

Figure 3:
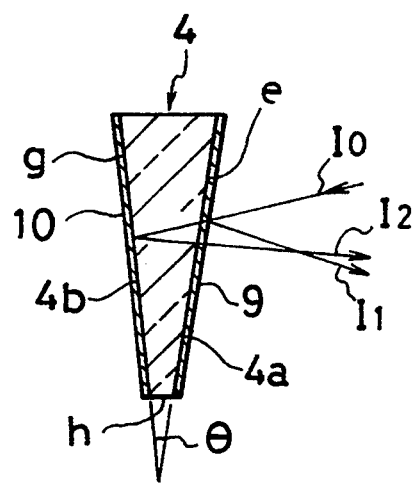
FIG. 3 is a sectional view taken along line III—III in FIG. 2.
Figure 4:
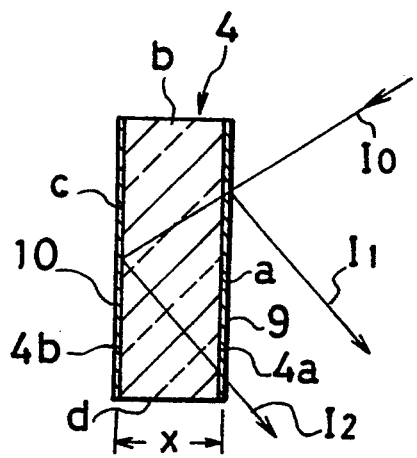
FIG. 4 is a sectional view taken along line IV—IV in FIG. 2.

When the wedged plate 4 is viewed in a three-dimensional (X-Y-Z) coordinate system defined in the orientation shown in FIGS. 3 and 4, the section thereof parallel to the Z-X plane is a parallelogram having sides a, b, c and d. On the other hand, the section thereof parallel to the Y-X plane has opposite sides which are slightly out of parallel. The angle $\theta$ between them is in the range of about 1 second to about one minute. The interval between the interference fringes decreases and the measurement sensitivity falls in proportion as the angle $\theta$ increases. Conversely, the interval between the interference fringes increases and the measurement sensitivity rises in proportion as the angle $\theta$ decreases. The angle $\theta$ of the wedged plate 4 is therefore appropriately matched to the amount of aberration of the lens to be tested: a wedged plate 4 with a large angle $\theta$ is selected for a lens with large aberration and one with a small angle $\theta$ is selected for a lens with small aberration.

The wedged plate 4 is ordinarily formed of glass or the like. Its front optical surface (the surface including sides a and e) is coated with a reflective thin film 9 and its rear optical surface (the surface including sides c and g) with a reflective thin film 10. The reflective thin films 9 and 10 can be formed by vapor deposition of a reflective metal such as aluminum or chromium, or by lamination of multiple dielectric thin films.

The contrast of the interference fringes increases with increasing reflectance of the reflective thin film 9, which therefore preferably has a reflectance of 70-80% and a transmittance of 10-20%. In other words, up to 20% of the light which is incident on film 9 will be absorbed by the film. The reflectance of the reflective thin film 10 should be as high as possible.

Figure 5:
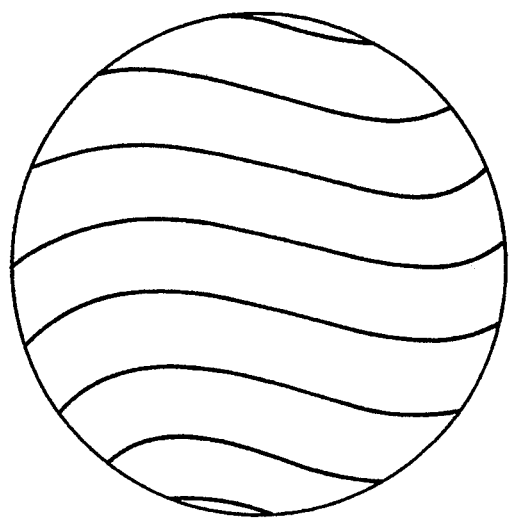
FIG. 5 shows interference fringes observed with a shearing interferometer according to the invention.
Figure 11:
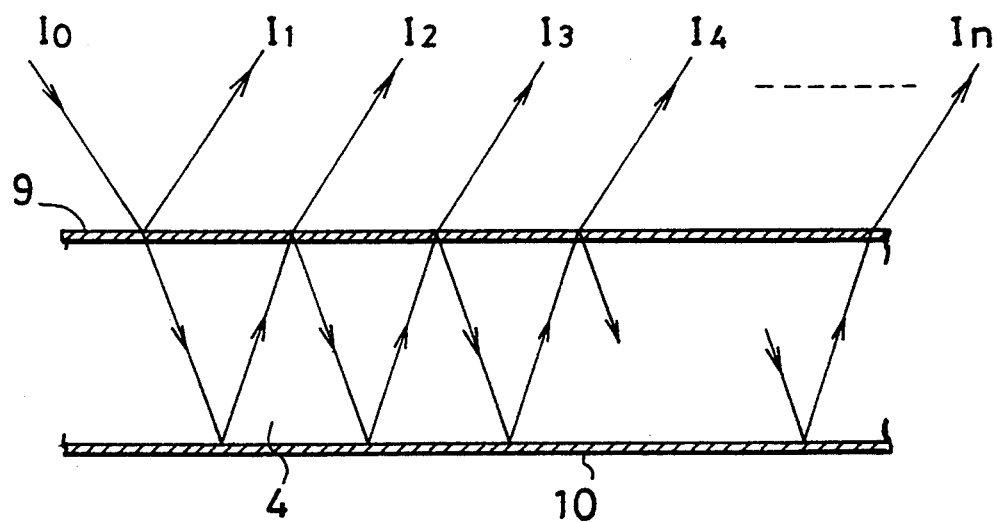
FIG. 11 is a diagram showing how multiple beams are reflected by the wedged plate.

In the shearing interferometer 1 of the foregoing configuration, the laser beam from the laser beam source 2 is spread by the microscope objective 3 and collimated into a parallel beam the test lens 8, and the collimated beam falls incident on the wedged plate 4. At the wedged plate 4, the reflecting action of the front and rear optical surfaces 4a and 4b coated with the reflective thin films 9 and 10 causes the incident wavefront I0 to be repeatedly reflected so that, as shown in FIG. 11, a plurality of reflected beams I1, I2, I3, I4 . . . In are obtained. The wavefronts of the beams I1, I2, I3, I4 . . . In are distorted with respect to that of the parallel beam by the amount of aberration of the test lens 8, are laterally shifted, and are tilted with respect to each other. Specifically, as shown in FIGS. 3, 4 and 11, when the beam I0 from the test lens 8 strikes the wedged plate 4, it is split into a beam I1 reflected by the front optical surface 4a of the wedged plate 4 and beams I2, I3, I4 . . . In resulting from repeated reflection between the front optical surface 4a and the rear optical surface 4b. Since the front optical surface 4a and the rear optical surface 4b are separated by a distance x, the exit position of each reflected beam is laterally shifted by $n.\Delta S$ with respect to the exit position of the preceding reflected beam. (See FIGS. 4 and 8.) A lateral shift is thus imparted between the wavefronts of the exiting reflected beams. On the other hand, since the front and rear optical surfaces 4a, 4b make the angle $\theta$, each reflected beam is tilted with respect to the preceding reflected beam upon exiting the wedged plate 4. (See FIGS. 3 and 7.) As a result, a tilt is imparted between the wavefronts of the reflected beams. Thus both lateral shift (shear) and tilt is imparted between the wavefronts. (See FIG. 9.) As shown in FIG. 5, the interference fringes formed on the screen 6 by the wavefronts of the beams I1, I2, I3, I4 . . . In are those between wavefronts imparted with tilt in addition to ordinary shear. This makes it possible to observe the phase shift caused by shear in terms of the lateral shift of the interference fringes resulting from the tilt.

Figure 6:
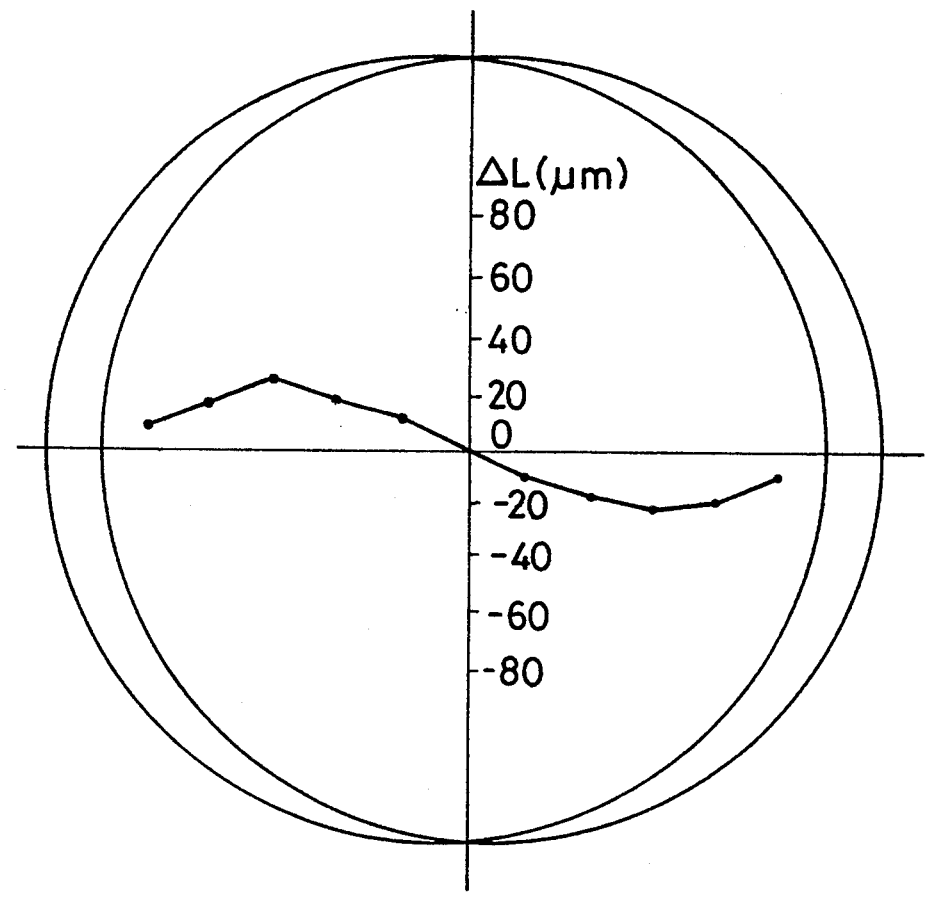
FIG. 6 is a graph showing a lateral aberration curve measured with a conventional shearing interferometer and corresponding to the interference fringe passing through the center of the field of vision obtained with the shearing interferometer according to the invention.

FIG. 6 shows a lens aberration curve measured using an ordinary shearing interferometer, which will be noted to be equivalent to the interference fringe passing through the center of the field of vision in FIG. 5. The numerals along the vertical axis in FIG. 6 indicate the amount of aberration. FIG. 5 can be similarly scaled by calculation.

The reason why the invention is able to produce a lens aberration curve will now be explained.

Figure 7:
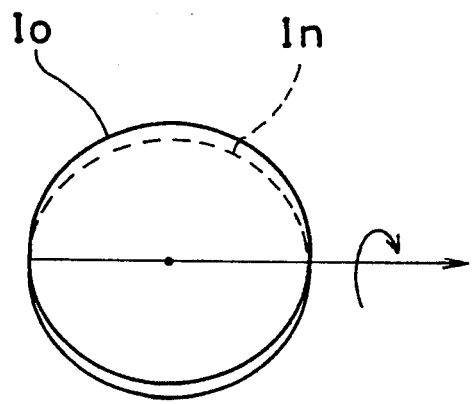
FIG. 7 is a diagram showing two tilted wavefronts.
Figure 8:
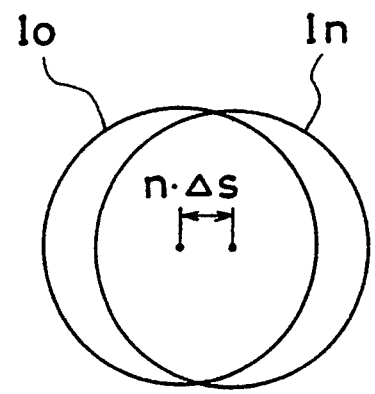
FIG. 8 is a diagram showing two laterally shifted wavefronts.
Figure 9:
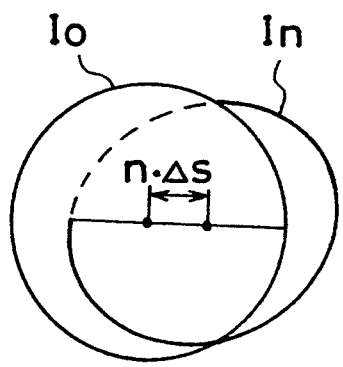
FIG. 9 is a diagram showing two laterally shifted and tilted wavefronts.
Figure 10:
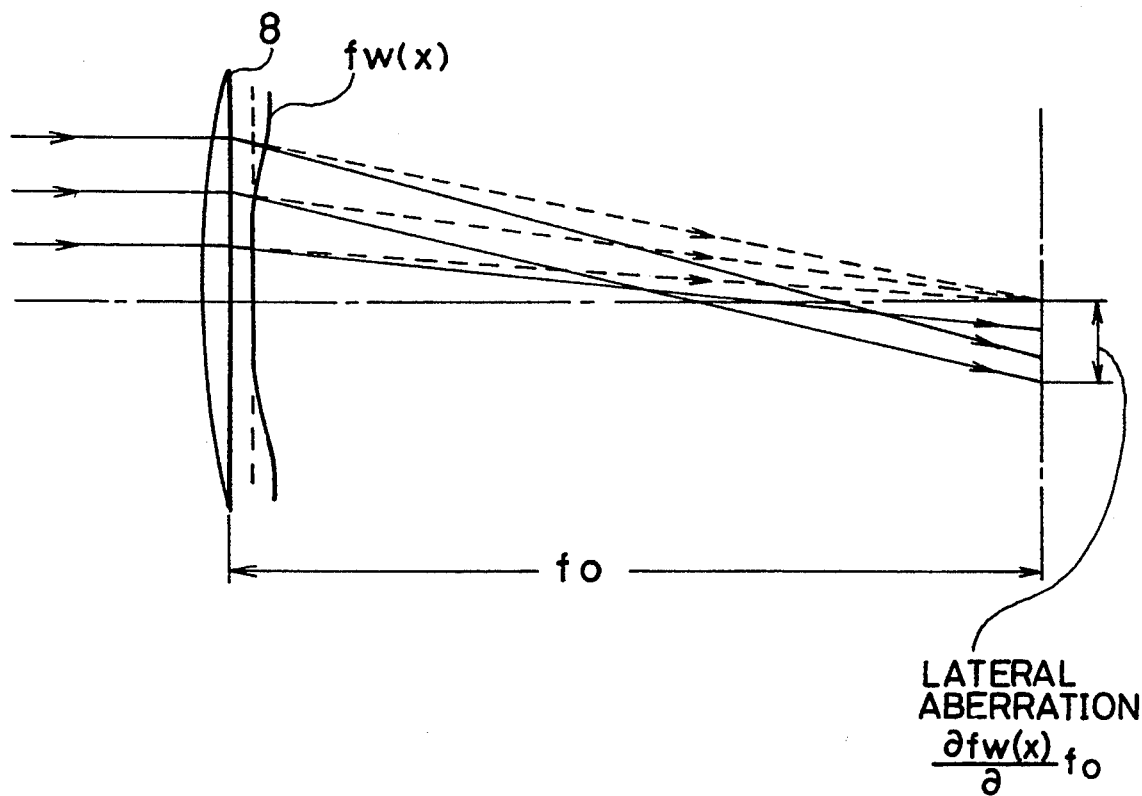
FIG. 10 is a diagram illustrating the lateral aberration of a lens.

The basic principle involved is that the wavefront from the test lens is sheared in the horizontal direction as shown in FIG. 8 and is further tilted by a slight rotation around the horizontal axis as shown in FIG. 7. Because of this, the amount by which the interference fringes are laterally shifted owing to the tilt represents the phase shift owing to the shear. On the other hand, when a parallel beam is passed through an ideal lens with no lateral aberration, it converges on the focal point as shown by the broken lines in FIG. 10. When the lens has aberration, however, the rays of the incident parallel beam do not converge on a single point. This is shown by the solid lines in FIG. 10. In this case, the amount of lateral aberration is the lateral distance over which the rays intersect the focal plane and is equal to the product of the differential value of the wavefront and the focal distance. The differential value of the wavefront can therefore be obtained by shearing interference, and since the amount thereof is the amount of lateral interference fringe shift owing to tilt, the tilt interference fringe passing through the center of the lens is proportional to the aberration curve. The lateral aberration curve can therefore be obtained by determining the scale of the horizontal axis.

Determination of the lateral aberration curve in this way is facilitated by the fact that the multiple interference between the reflected beams I1, I2, I3, I4 . . . In narrows the widths of the interference fringes.

Figure 12:
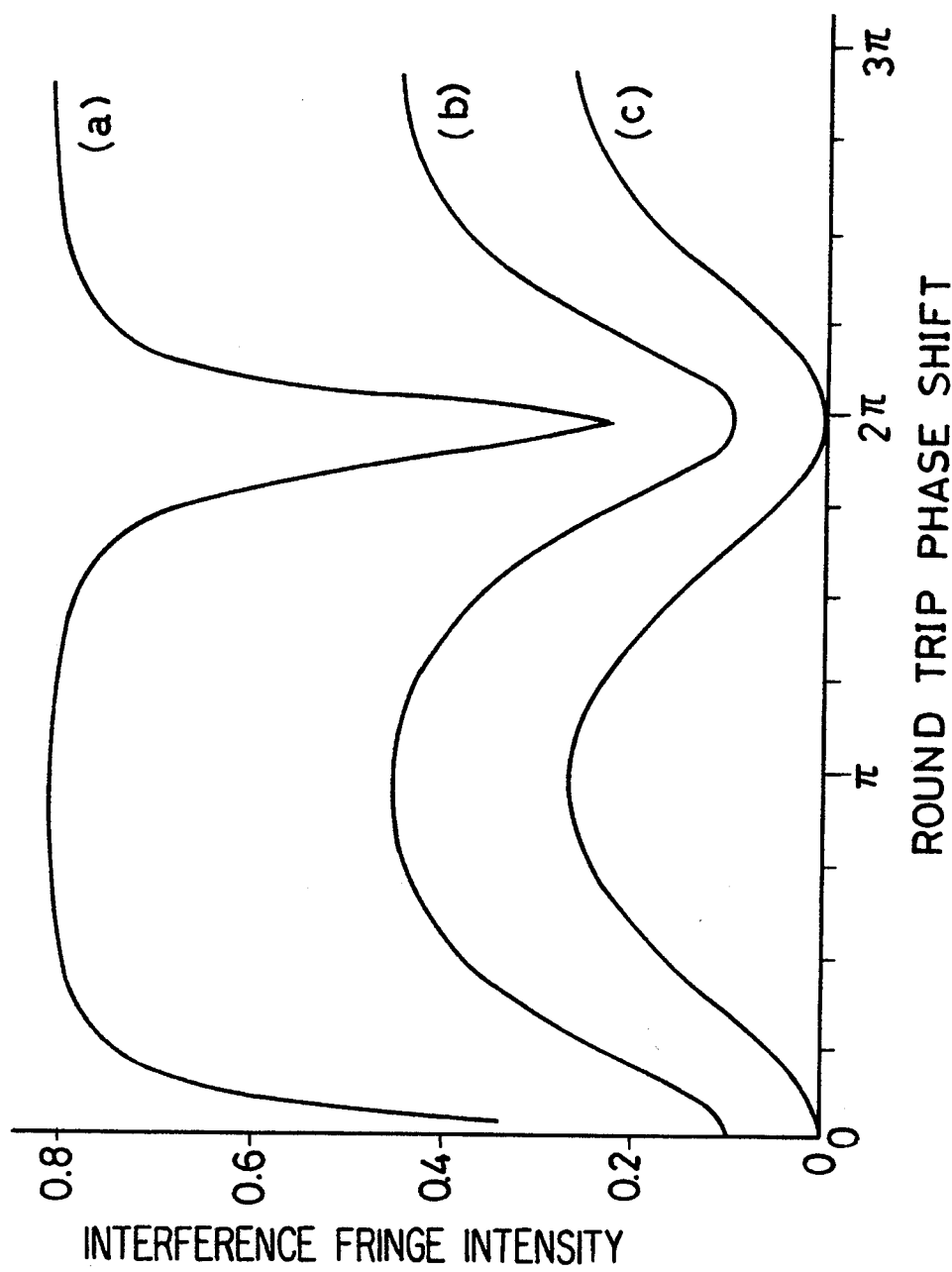
FIG. 12 is a graph showing how interference fringe intensity varies with phase shift.

The graph of FIG. 12 shows how interference fringe intensity varies with phase shift. Curve a represents the intensity of interference fringes formed using a wedged plate having a reflective thin film with a reflectance of 70% and a transmittance of 13% on its front surface i.e., 17% of the light is absorbed and a reflective thin film with a reflectance of 70% on its rear surface. Curve b represents the interference fringe intensity using a wedged plate having a reflective thin film whose reflectance and transmittance were both 30% on its front surface i.e., 40% of the light is absorbed and a reflective thin film with a reflectance of 30% on the rear surface. Curve c represents the interference fringe intensity using a wedged plate having a reflective thin film with a reflectance of 10% and a transmittance of 70% on its front surface i.e. 20% of the light is absorbed and a reflective thin film with a reflectance of 10% on its rear surface. The numerals on the vertical axis in FIG. 12 stand for the relative intensity of the reflected beam when the intensity of the beam incident on the wedged plate is set to be 1.0.

As can be seen in FIG. 12, sharper interference fringes are obtained by using a wedged plate provided with reflective thin films with high reflectances.

Figure 13:
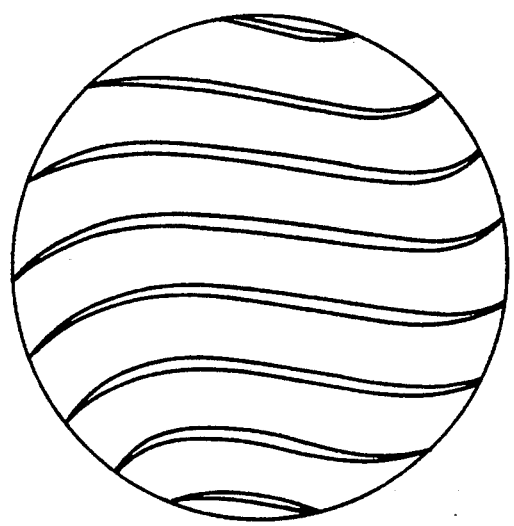
FIG. 13 shows interference fringes observed using the wedged plate with reflective thin films according to the invention.

FIG. 13 shows interference fringes formed when a 10 mm-thick wedged plate vapor deposited on its front surface with an aluminum reflective thin film having a reflectance of about 71% and a transmittance of about 12% and on its rear surface with an aluminum reflective thin film having a reflectance of 90% was given a tilt of 2.7 seconds. For comparison, FIG. 14 shows interference fringes formed under the same conditions except that the wedged plate had no reflective films.

Figure 14:
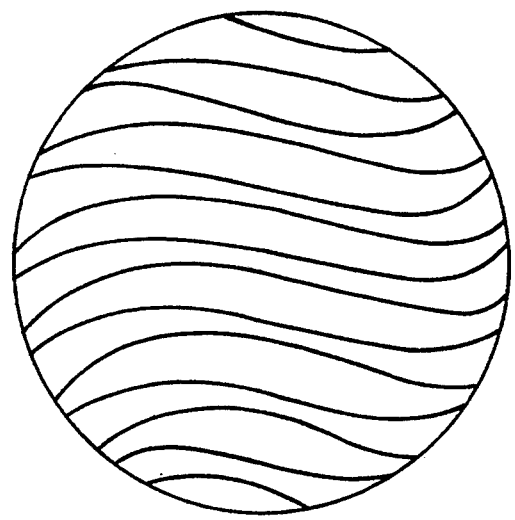
FIG. 14 shows interference fringes observed using a wedged plate without reflective films.

As is clear from a comparison of the interference fringes of FIGS. 13 and 14, the provision of the reflective thin films on the wedged plate results in markedly narrower interference fringes.

As will be understood from the foregoing explanation, the shearing interferometer for measuring lens lateral aberration according to the invention uses the lateral shift of interference fringes produced by tilt to enable shearing interference fringes to be used directly as aberration curves, thus making it possible to determine the lateral aberration of a lens from shearing interference fringes without need for the complex operations and calculations required up to now. Moreover, since the only optical element used for imparting the wavefront from the test lens with lateral shift and tilt is the wedged plate, the interferometer is of simple structure and is easy to assemble and adjust. In addition, since the wedged plate is provided with reflective thin films that enable interference between a large number of wavefronts, the width of the interference fringes can be narrowed, and since this makes it possible to achieve higher sensitivity by expanding the intervals between the interference fringes with no sacrifice of read-out accuracy, the measurement can be conducted with both high sensitivity and high accuracy.

What is claimed is:

1. A shearing interferometer for measuring lateral aberration of a lens, comprising:
   a laser beam source;
   an objective for spreading a laser beam from said laser beam source;
   a slightly wedged plate having a front optical surface and a rear optical surface for receiving the spread beam from said objective; said lens being disposed in an optical path between said objective and said wedged plate for collimating the spread beam;
   a first reflective thin film formed on said front optical surface of said wedged plate;
   a second reflective thin film formed on said rear optical of said wedged plate;
   a focusing lens for causing interference between wavefronts split by said wedged plate; and
   a screen for displaying interference fringes formed.

2. A shearing interferometer according to claim 1, wherein said first reflective thin film has a reflectance of 70–80% and a transmittance of 10–20%.

* * * * *

UNITED STATES PATENT AND TRADEMARK OFFICE
CERTIFICATE OF CORRECTION

PATENT NO. : 5,355,218
DATED : October 11, 1994
INVENTOR(S) : Kiyofumi MATSUDA, et al.

It is certified that error appears in the above-indentified patent and that said Letters Patent is hereby corrected as shown below:

On the title page, Item [75], the second and fourth inventors' names should read:

--Tomoaki Eiju and Shigeru Kokaji--

Signed and Sealed this

Third Day of January, 1995

Attest:

BRUCE LEHMAN

Attesting Officer

Commissioner of Patents and Trademarks